(12) United States Patent
Dai et al.

(10) Patent No.: US 11,481,022 B2
(45) Date of Patent: Oct. 25, 2022

(54) MOTION BASED POWER STATES

(71) Applicant: HEWLETT-PACKARD DEVELOPMENT COMPANY, L.P., Spring, TX (US)

(72) Inventors: Fangyong Dai, Houston, TX (US); Asjad Shamim, Houston, TX (US); Raghotham Reddy Nathadi, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 226 days.

(21) Appl. No.: 16/479,241

(22) PCT Filed: Aug. 18, 2017

(86) PCT No.: PCT/US2017/047555
§ 371 (c)(1),
(2) Date: Jul. 19, 2019

(87) PCT Pub. No.: WO2019/035843
PCT Pub. Date: Feb. 21, 2019

(65) Prior Publication Data
US 2020/0174549 A1  Jun. 4, 2020

(51) Int. Cl.
*G06F 1/3296* (2019.01)
*G06F 1/16* (2006.01)
(Continued)

(52) U.S. Cl.
CPC .......... *G06F 1/3296* (2013.01); *G06F 1/1615* (2013.01); *G06F 1/1684* (2013.01);
(Continued)

(58) Field of Classification Search
CPC .... G06F 1/3296; G06F 1/1615; G06F 1/1684; G06F 1/3231; G06F 3/0354; G06F 3/041
See application file for complete search history.

(56) References Cited

U.S. PATENT DOCUMENTS 6,061,051 A * 5/2000 Chan ................ G06F 3/045
345/173
7,728,316 B2  6/2010 Fadell et al.
(Continued)

FOREIGN PATENT DOCUMENTS

CN   105874401 A    8/2016
CN   103838371 B *  9/2017  .......... G06F 1/1686
(Continued)

OTHER PUBLICATIONS

Understanding Touch Responsiveness-Touchscreen Technology Series 2, Jul. 2, 2014.

*Primary Examiner* — Vincent H Tran
(74) *Attorney, Agent, or Firm* — Brooks, Cameron & Huebsch PLLC

(57) ABSTRACT

Example implementations relate to motion based power states. For instance, in an example an electronic device includes input components, a motion detector separate from the input components, the motion detector to detect over a period of time an amount of motion of an object proximate to the electronic device, and a controller to compare the detected amount of motion of the object to a motion threshold, and alter a power state of an input component of the input components based on the comparison.

15 Claims, 5 Drawing Sheets

(51) Int. Cl.
*G06F 1/3231* (2019.01)
*G06F 3/0354* (2013.01)
*G06F 3/041* (2006.01)

(52) U.S. Cl.
CPC .......... *G06F 1/3231* (2013.01); *G06F 3/0354* (2013.01); *G06F 3/041* (2013.01)

(56) References Cited

U.S. PATENT DOCUMENTS

| | | | |
|---|---|---|---|
| 8,005,454 | B1 | 8/2011 | Lavelle et al. |
| 8,392,735 | B2 | 3/2013 | Mucignat et al. |
| 8,650,418 | B2 | 2/2014 | Wu et al. |
| 8,743,083 | B2 | 6/2014 | Zanone et al. |
| 8,898,496 | B1 | 11/2014 | Chi |
| 8,918,665 | B2 | 12/2014 | Low et al. |
| 9,176,608 | B1 | 11/2015 | Baldwin et al. |
| 9,977,594 | B2 * | 5/2018 | Huh ...................... G06F 3/0219 |
| 10,108,157 | B1 * | 10/2018 | Raghavan .......... G06K 9/00771 |
| 2007/0102525 | A1 | 5/2007 | Orr et al. |
| 2008/0270814 | A1 * | 10/2008 | Starr ..................... G06F 1/3203 |
| | | | 713/323 |
| 2009/0322683 | A1 * | 12/2009 | Tsuji .................. G06F 3/03547 |
| | | | 345/173 |
| 2010/0060579 | A1 * | 3/2010 | Huang .................. G06F 1/3259 |
| | | | 345/163 |
| 2010/0235667 | A1 * | 9/2010 | Mucignat .............. G06F 1/3203 |
| | | | 713/323 |
| 2011/0102570 | A1 * | 5/2011 | Wilf ........................ G06F 3/017 |
| | | | 345/156 |
| 2011/0296163 | A1 * | 12/2011 | Abernethy ............ G06F 1/3203 |
| | | | 713/100 |
| 2012/0290257 | A1 * | 11/2012 | Hodge .................... G06F 3/011 |
| | | | 702/150 |
| 2012/0319972 | A1 * | 12/2012 | Tse .......................... G06F 3/042 |
| | | | 345/173 |
| 2013/0207905 | A1 * | 8/2013 | Hankins ................. G06F 21/36 |
| | | | 345/173 |
| 2014/0049480 | A1 * | 2/2014 | Rabii ...................... G06F 3/041 |
| | | | 345/173 |
| 2014/0055357 | A1 * | 2/2014 | Dave ..................... G06F 1/3231 |
| | | | 345/168 |
| 2014/0292670 | A1 * | 10/2014 | Cho ....................... G06F 1/1647 |
| | | | 345/173 |
| 2015/0199102 | A1 * | 7/2015 | Koh ....................... G06F 1/3265 |
| | | | 715/835 |
| 2016/0116960 | A1 * | 4/2016 | Kwak ................... G06F 1/3206 |
| | | | 713/323 |
| 2016/0246364 | A1 * | 8/2016 | Miller ...................... G06F 3/012 |
| 2017/0010654 | A1 * | 1/2017 | Chen .................... G06F 1/3265 |
| 2018/0188944 | A1 * | 7/2018 | Cho ................... G06F 3/04883 |
| 2018/0321731 | A1 * | 11/2018 | Alfano ................. G06F 1/3265 |
| 2019/0212867 | A1 * | 7/2019 | Han ....................... G06F 3/0412 |
| 2021/0132769 | A1 * | 5/2021 | Parikh .................. G06F 1/1616 |

FOREIGN PATENT DOCUMENTS

| | | |
|---|---|---|
| TW | 201132107 A | 9/2011 |
| TW | 201539182 A | 10/2015 |

* cited by examiner

MOTION BASED POWER STATES

BACKGROUND

Computing devices such laptop computers, desktop computers, various phones such as mobile phones, etc. may consume power. A rate at which a computing device consumes power may vary. Mobile computing devices such as mobile phones and/or laptop computers may have a battery and/or other type of power supply to provide power to the mobile computing device.

DETAILED DESCRIPTION

Figure 1:
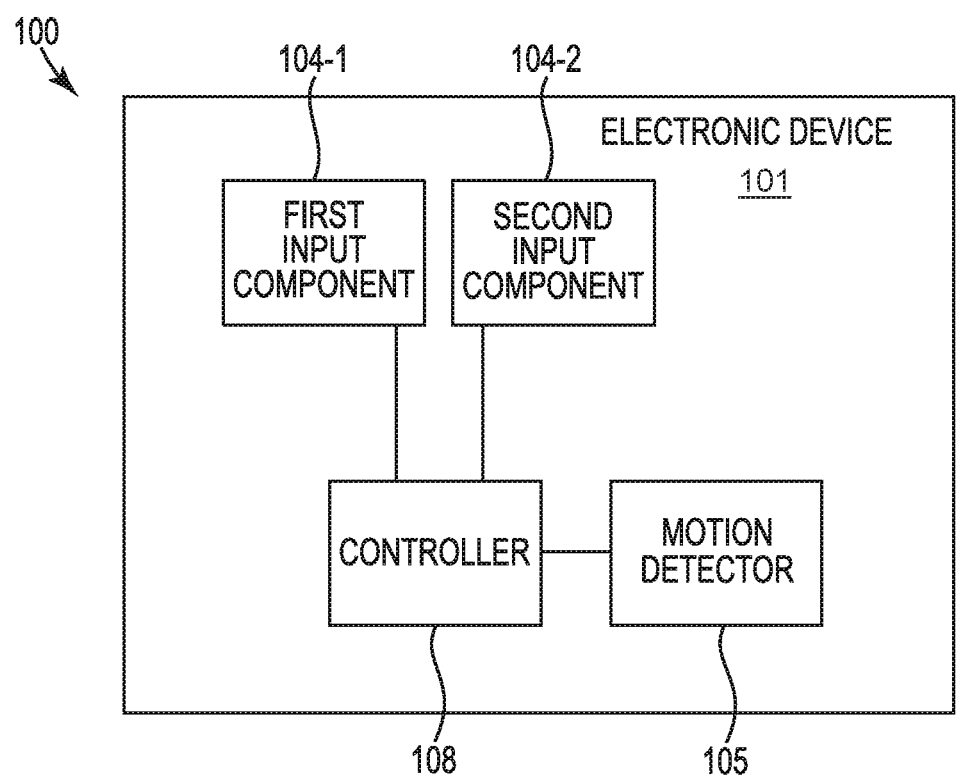
FIG. 1 illustrates a diagram of an example of an electronic device suitable with motion based power states according to the disclosure.

Computing devices may utilize power management to reduce an amount of power they consume. For example, wireless computing devices may rely on portable power sources such as battery that provide a finite amount of power available to run the wireless computing devices. As such wireless computing devices may utilize power management schemes to extend the amount of time that the wireless computing device may operate before exhausting the finite amount of power.

In some approaches, a computing device may utilize various system power states to achieve power management. For example, a computing device may switch between various system power states depending on operating conditions of the computing devices. In some examples, the system power states may correspond to various levels of sleep states. A sleep state may include a distinct configuration of the operation of the computing device wherein various unused components (e.g., hardware, instructions executable by a processor, etc.) of the computing device are, to some extent, disabled or placed in a lower power consumption state. A sleep state of a computing device may correspond to an Advanced Configuration and Power Interface (ACPI) specification power state. However, input components such a touchscreen, an operating system, and/or supplicant of the operating system may be disabled and/or become unavailable during various system power states. As such, a computing device may not provide a desired function (e.g., a touchscreen may not display content) when employing a system power state (e.g., when a computing device operates in a configuration corresponding to the ACPI specification S1, S2, S4, and/or S5 states).

Other approaches may attempt to control power consumption at an individual component level. For example, computing devices may include input components (keyboard, touchpad, display such as a touchscreen, stylus, etc.) that consume power. An input component can have a hierarchy of potential power states (e.g., 'idle', 'standby', and 'active', etc.) that consume increasing amounts of power. Some approaches attempting to control power consumption at an individual component level may rely on individual components (e.g., a touchpad) with integrated capacitive and/or resistive elements to detect the presence of an object (e.g., via a change in an electrical field) in contact with and/or about to contact the individual component. However, such approaches may not be capable of discerning motion of an object and instead may merely sense when an object is proximate to an electronic device and/or may be limited to solely controlling power consumption of the individual component.

Accordingly, the disclosure is directed to motion based power states. As used herein, motion based power states refers to altering a power state of an input component based on comparison of a detected amount of motion of an object to a motion threshold. For instance, in various examples, an electronic device can include input components, a motion detector separate from the input components, the motion detector to detect over a period of time an amount of motion of an object proximate to the electronic device, and a controller to compare the detected amount of motion of the object to a motion threshold and alter a power state of an input component of the input components based on the comparison.

Desirably, motion based power states can provide enhance power control as compared to other approaches employing system level control (e.g., ACPI) specification power state, and/or those relying on individual component specific detection of objects. For instance, based on the comparison a first input component (e.g., a touchpad) can be altered to an idle power state while a second input component (e.g., a touchscreen) can remain in an active power state or be altered to a standby power state, among other possibilities.

FIG. 1 illustrates a diagram of an example of an electronic device 100 suitable with motion based power states according to the disclosure. As illustrated in FIG. 1, the electronic device 100 can include a housing 101, input components such as a first input component 104-1 and/or a second input component 104-2 (referred to herein generally as a 'input component 104'), a motion detector 105, and a controller 108, among other components such as those described herein.

The electronic device 100 can be a mobile phone, a wearable electronic device, a tablet, a laptop computer, a desktop computer, or combinations thereof. In some examples, the electronic device 100 can be an all-in-one (AIO) computer. As used herein, an AIO computer refers to a computer which integrates the internal components into the same case as the display, and offers the touch input functionality of the tablet devices while also providing the processing power and viewing area of desktop computing systems. In such examples, the motion detector 105 can be embedded in a bezel of the AIO computer, as described herein.

The housing 101 can form an exterior surface of an electronic device such as those described herein. In various examples, the housing 101 and/or the bezel can form an internal volume of the electronic device 100. The first input component 104-1, the second input component 104-2, and/or controller 108, among other possible components such as those described herein, can be disposed in the internal volume of the electronic device 100. As used herein, "disposed" means a location at which something is physically positioned. In various examples, the housing 101 can include components such as a display, battery, input/output device, among other types of components. The housing 101 can be formed of fabric, metal, and/or plastic, among other suitable material to promote motion based power states, as described herein.

The motion detector 105 can be a three-dimensional (3D) camera, an infrared camera, a 3D scanner camera, digital camera, and/or other type of camera. The motion detector can include a lens. A lens refers to an optical lens or assembly of lenses used in conjunction with an image sensor to make images of objects on either media capable of storing an image electronically. The image sensor (not illustrated) refers to a sensor capable of sensing information (e.g., light) that constitutes an image (such as the presence and/or movement of an object) and conveying the captured information. For instance, the image sensor can capture information and convey the captured information to an image processor which can further process and/or store the captured information. Examples of suitable image sensors include a charge coupled device (CCD), and a complementary metal-oxide semiconductor (CMOS) sensor, among other types of image sensors.

The lens has a field of view. As used herein, a field of view refers to the extent of the observable world that is seen at any given moment. For instance, the field of view can be a particular solid angle through which a motion detector such as those described herein are able to detect electromagnetic radiation which passes through a lens of the motion detector. The lens can be a fixed lens or can be a telescoping lens or other type of mechanically adjustable lens.

In various examples, the motion detector 103 is an infrared camera. As used herein, an infrared camera refers to a camera to detect light in the infrared spectrum. The infrared camera can be a passive infrared camera or an active infrared camera. An active infrared camera refers to a device that is to detect ambient infrared light and infrared light emitted by a light emitting component included in the device. A passive infrared camera refers to a device that is to detect ambient infrared light and does not include a light emitting component. That is, in some examples the motion detector comprises a passive infrared camera. For instance, in some examples, the electronic device includes a passive infrared camera and does not include an active infrared camera, as an active infrared camera may consume more power over a given period of operation as compared to a passive infrared camera.

The input components 104 refer to a device and/or a portion of a device that can receive a user input and translate the user input into data and/or control signals for an electronic device such as electronic device 100. Examples of input components include a physical keyboard with mechanically actuated buttons, a joystick able to be physically actuated into various position, a peripheral device such as a stylus, mouse and/or a trackball that are physically manipulated by a user, and/or a touch-sensitive input component such as a touchscreen or touchpad, among other possible types of input components.

As used herein, a touch-sensitive input component may include a touch sensitive interface that receives input by detecting user movement and/or user touch at or near the touch-sensitive interface. In contrast to a mechanical input interface, the touch-sensitive interface may translate user touch and/or movement along a touch-sensitive region overlaid on or otherwise disposed in a display instead of relying on a user physically manipulating a device such as a keyboard button or a physical mouse.

As used herein, a touch screen refers to an input and/or output device layered on top of an electronic visual display (e.g., monitor) of a computing device to receive a touch input. The touch screen can detect user input as a particular individual gesture or multi-touch gestures by touching on or near the screen with a stylus and/or one or more fingers. The touchscreen can facilitate a user to interact directly with what is displayed (e.g., icons on a graphical user interface (GUI) displayed by the computing device, a virtual keyboard, GUI components of instructions executing on the computing device, pictures, videos, etc.). As used herein, a touchpad comprises a pad sensitive to touch to receive input based upon manual touching of or contact with the touchpad. Input can be from a user movement (e.g., user sliding finger or fingers across a surface of touchpad and/or tapping the surface of touchpad).

Figure 2:
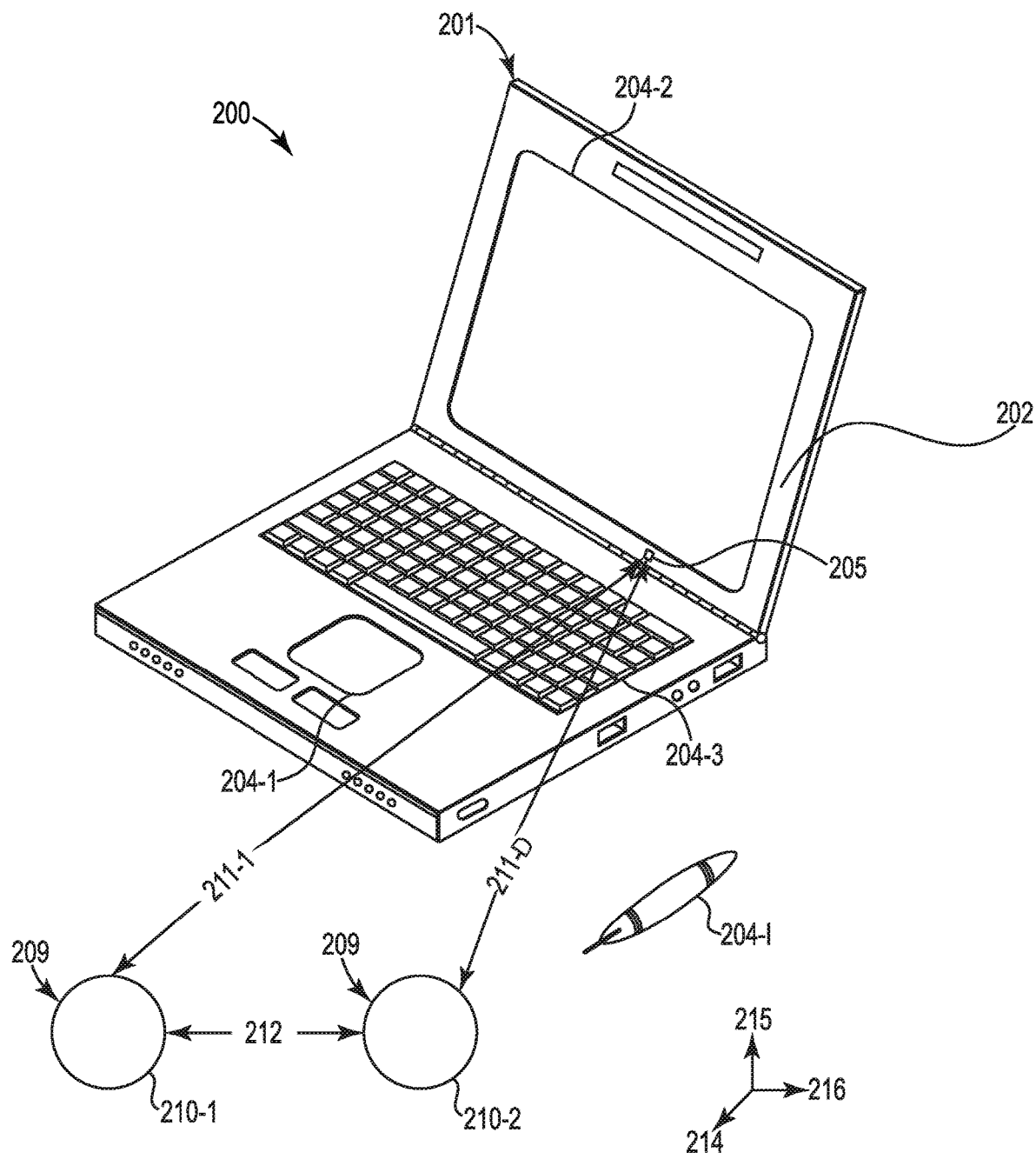
FIG. 2 illustrates a view of an example of an electronic device suitable with motion based power states according to the disclosure.

FIG. 2 illustrates a view of an example of an electronic device 200 suitable with motion based power states according to the disclosure. As illustrated in FIG. 2, the electronic device 200 can include a housing 201 including a bezel 202, a first input component 204-1 and a second input component 204-2, a third input component 204-3, a fourth input component 204-I, and a motion detector 205, among other possible components.

The bezel 202 refers to a component that surrounds an electronic display such as a touchscreen of an electronic device. For instance, the bezel 202 can surround a periphery of an electronic display such as a graphical user interface and/or a liquid crystal display included in an electronic device such as a laptop or mobile phone, among other types of electronic devices including those described herein. The bezel 202 can be formed of a same or different material than a material forming other portions of the housing 201. For instance, the bezel 202 can be formed of fabric, metal, and/or plastic, among other suitable materials.

The first input component 204-1 and the second input component 204-2 can refer to a trackpad and a touchscreen, respectively, as illustrated in FIG. 1. However, while the first input component 204-1, the second input component 204-2, the third input component 204-3, and the fourth input component 204-4 are illustrated as particular types of input components at particular locations it is understood that a type, a total number, and/or a location of the input components 204 can be varied.

The third input component 204-3 can be a key array, among other possibilities. A key array refers to an array of keys serving as a keyboard for the electronic device 200. For instance, a key array can include an array of QWERTY keys and/or other arrangements of the keys. Keys can be actuatable (e.g., depressible) and/or selected for input in other manners.

The fourth input component 204-I can be a peripheral device such as a stylus, as illustrated in FIG. 2. Peripheral devices refer to devices disposed at a location outside of the housing 201 of the electronic device. As mentioned, examples of peripheral devices include a stylus, a mouse and/or a trackball that can be physically manipulated by a user to provide or otherwise cause an input to an electronic device.

In various examples, the motion detector 205 can be separate from input components 204 in contrast to other approaches that may rely on individual components (e.g., a touchpad) that have integrated components to detect the presence of an object. As used herein, being "separate" refers to being physically distinct and disposed at a different physical location. For instance, as illustrated in FIG. 2, the motion detector 205 can be disposed at a location other than locations of the input components 204 (e.g., is at a different location than a location of the first input component 204-1).

As mentioned, the motion detector 205 can be an IR motion detector (e.g., a passive IR motion detector). The motion detector 205 can sense infrared light reflected by the object 209, among other possibilities. In some examples, the motion detector 205 can be disposed in the bezel 202. In such examples, the motion detector 205 can have a field of view that extends beyond the housing 201 and can detect an object 209 that is in the field of view. Having the motion detector 205 disposed in the bezel 202 the motion detector 205 provides a field of view and extends a given distance in at least a first direction 214 such as a distance away from the housing 201 of the electronic device 200. For instance, the field of view of the motion detector 205 can extend a distance in the first direction 214 away from a housing of the electronic device 200 that is greater than a detection distance of those employing other approaches (e.g., those employing components such as a touchpad with integrated capacitive and/or resistive elements) that may detect the presence of an object in contact or about to contact (e.g., within 5 centimeters or less of a the component including the integrated capacitive and/or resistive components). Stated differently, in various examples, the motion detector 205 can desirably detect an object at least 10 centimeters away (e.g., substantially along the first axis 214) from the housing 201, in contrast to other approaches (e.g., those employing components (e.g., a touchpad) with integrated components such as capacitive and/or resistive elements) that may not be capable of detecting an object at such a distance away from a housing of an electronic device. However, the disclosure is not so limited. For instance, the motion detector can detect an object that is from 1 to 20 centimeters, from 10 to 20 centimeters, from 10 to 100 centimeters, and/or from 1 to 100 centimeters, etc., from the housing 201 of the electronic device. As illustrated in FIG. 2, the motion detector 205 can be included in the bezel 202 of the electronic device 200 at a location below the second input component 204-2, among other possible locations on an external portion of the housing 202.

In various examples, the motion detector 205 is to determine over a period of time an amount of motion of an object such as object 209 that is proximate to the electronic device 200. As used herein, an object is considered 'proximate' to the electronic device when it is within a given distance from the electronic device but not in contact with the electronic device. That is, an object can be a given distance (e.g., at least 5 centimeters) from an electronic device. A period of time can be equal to a predetermined amount of time (e.g., 60 seconds, 30 seconds, 15 seconds, 10 seconds, 5 seconds, 2 seconds, etc.) and/or can be specified by a user, among other possibilities.

Object 209 can represent a peripheral device and/or can represent a user or portion of a user such as a user's hand, head, and/or torso, etc. For example, the object 209 can represent a user sitting proximate to the electronic device 200. The amount of motion of the object can refer to a change in position of the object 209 from a first position 210-1 to a second position 210-2 relative to the motion detector 205.

For example, the object 209 can be a first distance (illustrated as 211-1) that is along a first axis 214, a second axis 215, and/or a third axis 216 relative to the motion detector 205 when the object is at a first position 210-1. Similarly, the object 209 can be a second distance (illustrated as 211-D) that is along a first axis 214, a second axis 215, and/or a third axis 216 relative to the motion detector 205 when the object is at a first position 210-1. The motion detector 205 is to sense the first distance 211-1 and the second distance 211-D and communicate the first distance 211-1 and the second distance 211-D to a controller that is to determine a detected amount of motion, compare the detected amount of motion (e.g., a distance 212 between the object 209 at the first position 210-1) of the object to a motion threshold and alter a power state of an input component of the input components based on the comparison, as described herein.

It is noted that while FIG. 2 illustrates the motion of the object 209 as occurring primarily (or entirely) along the third axis 216 the motion of the object can be determined along any of the first axis 214, the second axis 215, and/or the third axis 216. Similarly, comparing an amount of movement of the object 209 can be compared for a respective motion threshold for the first axis 214, the second axis 215, and/or the third axis 216. For instance, an amount (e.g., 5 millimeters) of movement 212 of the object 209 along the third axis 216 can be compared to a motion threshold of the third axis 216 (e.g., 10 millimeters) to promote various aspects of motion based power states, as described herein.

While FIG. 2 illustrates the object 209 as being at a total of two positions any suitable number of positions can be utilized to determine an amount of movement of the object 209. For example, a greater number of positions (e.g., a total of three positions) can be utilized and respective distances between each of the total number of positions can be divided by the total number of positions to determine an average or mean amount of motion of the object over a period of time. For instance, if over a period of time an object moves to a second position that is 5 millimeters from a first position (along a given axis) and to a third position is 10 millimeters from the first position (along the given axis) and 5 millimeters from the second position than an average amount of movement of the object can be equal to 5 millimeters ((5 millimeters+10 millimeters)/(3 positions)) over the period of time. In this manner, oscillation or other types of movement of an object can be averaged to provide reliable and consistent determinations of an amount of movement of an object.

Figure 3:
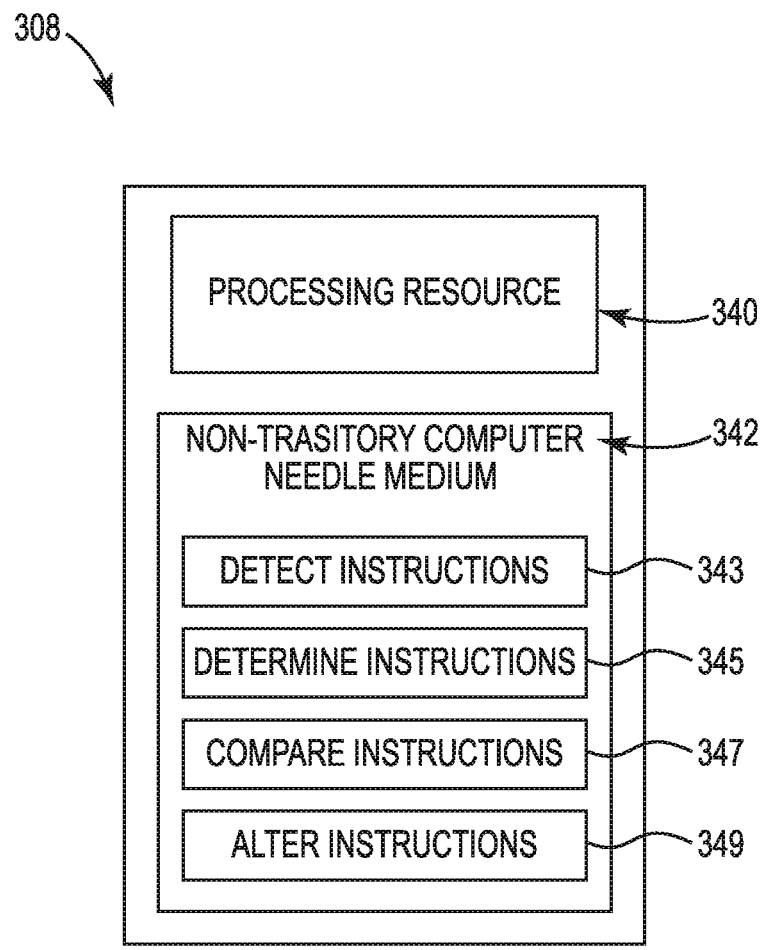
FIG. 3 illustrates a diagram of an example of a controller suitable with motion based power states according to the disclosure.

FIG. 3 illustrates a diagram of an example of a controller 308 suitable with motion based power states according to the disclosure. As illustrated in FIG. 3, the controller 308 can include a processing resource 340 and a non-transitory computer readable medium 342.

The processing resource 340 can be a central processing unit (CPU), a semiconductor based microprocessor, and/or other hardware devices suitable for retrieval and execution of machine-readable instructions such as those stored on the non-transitory computer readable medium 342.

The non-transitory computer readable medium 342 may be any electronic, magnetic, optical, or other physical storage device that stores executable instructions. Thus, non-transitory computer readable medium 342 may be, for example, Random Access Memory (RAM), an Electrically-Erasable Programmable Read-Only Memory (EEPROM), a storage drive, an optical disc, and the like.

The executable instructions may be "installed" on the controller 308 illustrated in FIG. 3. Non-transitory computer readable medium 342 may be a portable, external, or remote storage medium, for example, that allows the controller 308 to download the instructions 342 from the portable/external/remote storage medium. In this situation, the executable instructions may be part of an "installation package". As described herein, non-transitory computer readable medium 342 may be encoded with executable instructions related to motion based power states.

For instance, in various examples, processing resource 340 can execute detect instructions 343 to detect an object proximate to an electronic device including input devices having various power states, among other operations. Detection can include receiving infrared light or other light indicative of the presence of an object in a field of view of a motion detector, as described herein.

In various examples, processing resource 340 can execute determine instructions 345 to determine an amount of motion of the object over a period of time, as described herein. In various examples, processing resource 340 can execute compare instructions 347 to compare the determined amount of motion (e.g., 5 centimeters) to a motion threshold (10 centimeters), as described herein. A motion threshold can be equal to a predetermined amount of motion (e.g., 30 centimeters, 20 centimeters, 10 centimeters, 5 centimeters, and/or 3 centimeters, etc.) and/or can be specified by a user, among other possibilities.

In various examples, processing resource 340 can execute alter instructions 343 to alter some but not all input devices of the device to an idle power state of the predetermined power states when the determined amount of motion is less than the motion threshold. For instance, as described herein, an input component such as a trackpad, peripheral device, and/or keyboard array, etc. can be altered to an idle state while another input component included in the electronic device may remain in an active state (or be altered to an active state). Similarly, in some examples, an input component such as a trackpad, peripheral device, and/or keyboard array, etc. can be altered to an idle state while another input component included in the electronic device may be altered from an active state to a non-idle state such as a standby state.

For instance, the controller 308 can alter a power state of some but not all input devices to an idle power state responsive to the detected amount of motion (e.g., 5 centimeters along a given axis) being less than the motion threshold (e.g., 10 centimeters along a given axis). That is, in some examples, the input components can include a first input component (e.g., a touchpad and/or peripheral device) and a second input component (e.g., a touchscreen) where the controller 308 is to alter the first input component to an idle power state and alter the second input component to an active or standby power state responsive to a detected amount of motion being less than a motion threshold. Such input component specific alteration of power states based on motion can desirably provide reduced power consumption while still retaining a desired functionality (e.g., the touchscreen to display visual content while the first input component is in the idle state) the of the electronic device.

In some examples, processing resource 340 can execute instructions to determine the amount of motion of the object in a first dimension and a second dimension. That is, the processing resource can determine the amount of motion of the object relative to the electronic device and/or relative to a motion detector included in the electronic device in a first dimension (e.g., along the second axis 215 as illustrated in FIG. 2) and a second dimension (e.g., along the third axis 216 as illustrated in FIG. 2). In some examples, the motion detector can further comprise a distance detector such as a time of flight sensor to detect a distance of an object (e.g., a distance 211-1 of object 209 from the motion detector 205 as illustrated in FIG. 2).

Figure 4:
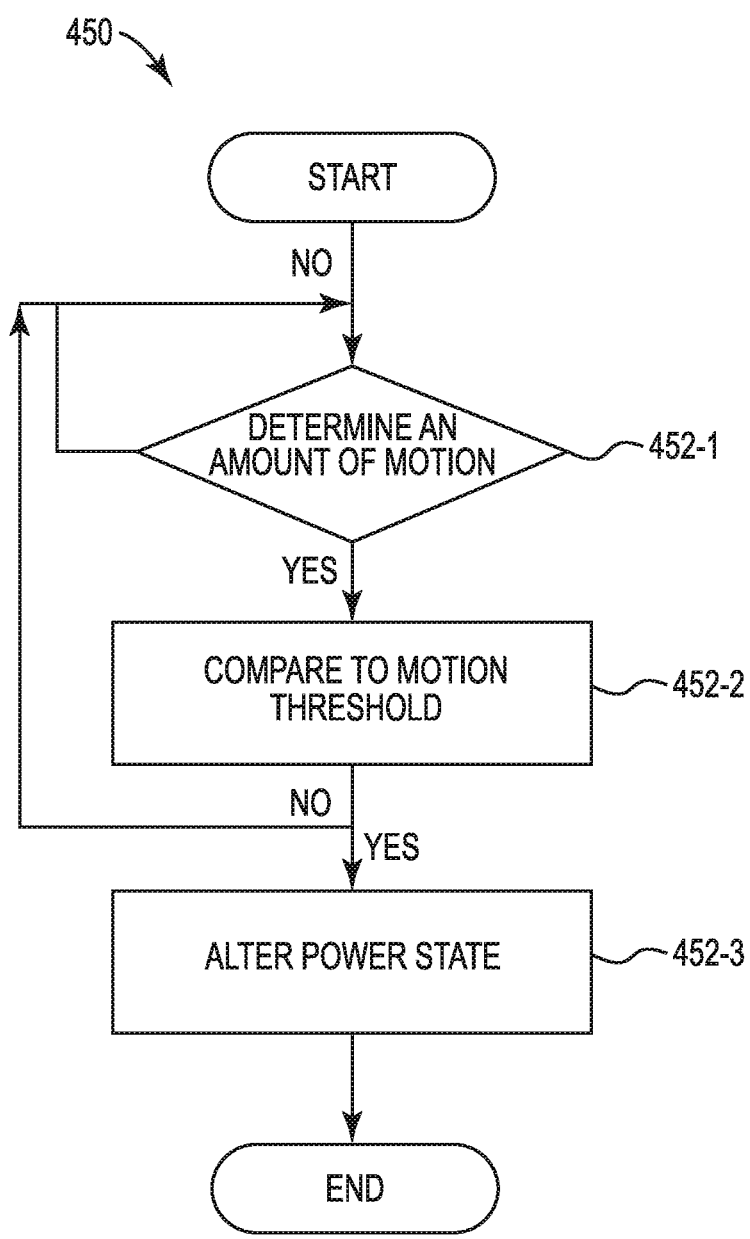
FIG. 4 illustrates a flow diagram of an example of an implementation of motion based power states according to the disclosure.

FIG. 4 illustrates a flow diagram 450 of an example of an implementation of motion based power states according to the disclosure. As illustrated at 452-1, the flow diagram 450 can include a determination of an amount of motion of an object. The determination of an amount of motion of an object can occur responsive to detection (initial detection) of an object in a field of view of a motion detector, responsive to a user input, and/or periodically, among other possibilities. If an object is not present in the field of view of the motion detector the flow diagram can return to the start. However, if an object is present the flow diagram can proceed to 452-2 responsive to a determination of an amount of motion of the object present in the field of view of the motion detector.

As illustrated at 452-2, the flow diagram 450 can include a comparison of the amount of motion (determined at 452-1) to a motion threshold. For example, the comparison can determine if the amount of motion is less than a motion threshold, among other possibilities. If no, then the flow diagram returns to the start as an object is deemed to be 'active' and the power state of an input component can be maintained in an active power state, among other possibilities. In such instances, a controller can maintain a signal to cause all input devices of an electronic device to remain in an active power state. However, if yes (i.e., if the amount of motion is less than the motion threshold), the flow diagram proceeds to 452-3.

At 452-3 the flow diagram 450 can alter a power state of an input component, as described herein. Responsive to altering the power state of the input component the flow diagram 450 can proceed to the end.

Figure 5:
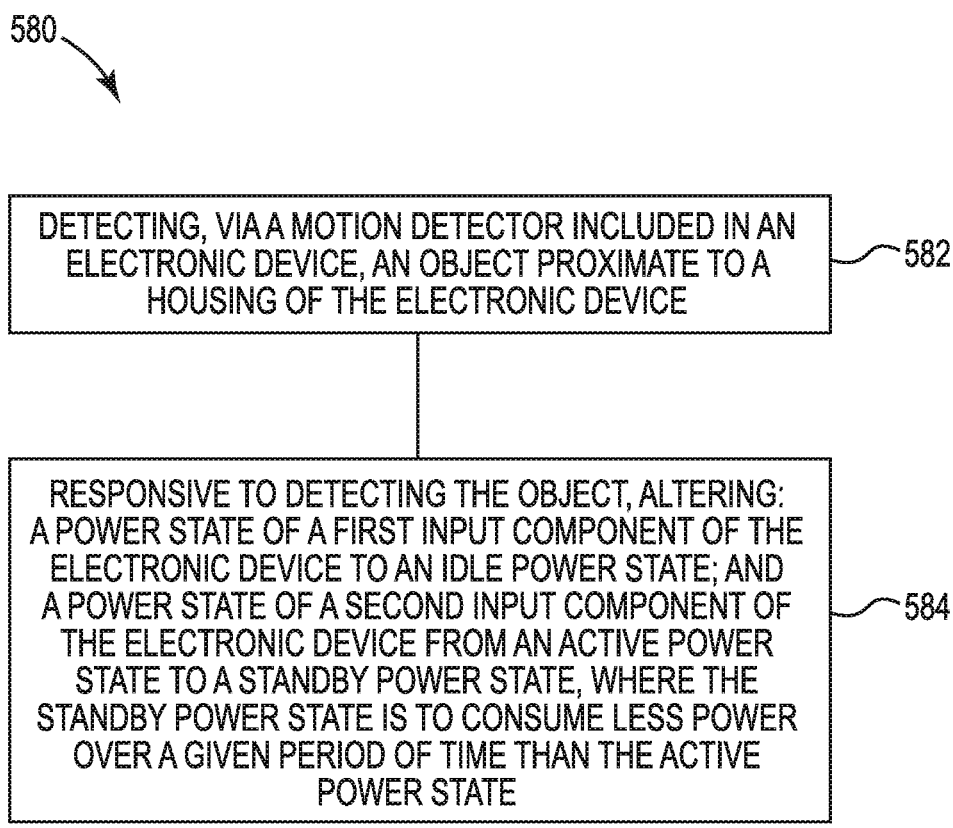
FIG. 5 illustrates a flow diagram of an example of a method according to the disclosure.

FIG. 5 illustrates a flow diagram of an example of a method according to the disclosure. As illustrated at 582, the method 580 can include detecting, via a motion detector included in an electronic device, an object proximate to a housing of the electronic device, as described herein.

As illustrated at 584, the method 580 can responsive to detecting the object, including altering a power state of a first input component of the electronic device to an idle power state and a power state of a second input component of the electronic device from an active power state to a standby power state. Notably, the standby power state is to consume less power over a given period of time than the active power state. For instance, a standby state can 'poll' for the presence of an object less often than an active power state and thereby consume less power, among other possibilities. In this manner, an overall power consumption of the electronic device can be reduced (at least as compared to maintaining all input components in an active state) and yet can provide a desired functionality (e.g., the touchscreen to display visual content while a trackpad is in the idle state). In some examples, the method 580 can include detecting an object at a distance of at least 10 centimeters away from the housing of the electronic device, in contrast to other approaches that may detect objects employing components (e.g., a trackpad) with integrated capacitive and/or resistive elements.

In some examples, the method 580 can include providing an electronic device including input components, a motion detector separate from the input components, and a controller. As used herein, the term "providing" refers to manufacture or procurement of an unassembled component intended for assembly into a larger system including a plurality of components such as an electronic device including those described herein.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples (e.g., having a different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 108 may refer to element 108 in FIG. 1 and an analogous element may be identified by reference numeral 208 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

What is claimed:

1. An electronic device, comprising:
    input components including a first input component and a second input component;
    a motion detector separate from the input components, the motion detector to detect over a period of time an amount of three-dimensional motion of an object proximate to the first input component of the electronic device; and
    a controller to:
        compare the detected amount of three-dimensional motion of the object to a motion threshold; and
        responsive to the three-dimensional motion being less than the motion threshold, alter a power state of:
            the first input component of the input components to be or remain active; and
            the second input component of the input components of the electronic device to an idle power state.

2. The electronic device of claim 1, wherein the first input component comprises a touchpad.

3. The electronic device of claim 1, wherein the first input component comprises a peripheral device coupled to the electronic device, wherein the peripheral device further comprises a mouse or stylus.

4. The electronic device of claim 1, wherein the second input component comprises a touchscreen.

5. The electronic device of claim 1, wherein the motion detector is included in a bezel surrounding a display of the electronic device.

6. The electronic device of claim 1, wherein the motion detector further comprises an infrared (IR) motion detector, wherein the infrared motion detector further comprises a passive IR motion detector.

7. The electronic device of claim 1, wherein the motion threshold includes a respective motion threshold for a first axis, a second axis, and a third axis, wherein the detected amount of three-dimensional motion includes an amount of motion of the object along each of the first axis, the second axis, and the third axis, and wherein the amount of motion along each of the first axis, the second axis, and the third axis is compared to the respective motion thresholds for the first axis, the second axis, and the third axis relative.

8. A controller including a processing resource and instructions executable to:
    detect an object proximate to an electronic device including input devices having predetermined power states;
    determine an amount of three-dimensional motion of the object proximate to a first input device of the input devices over a period of time;
    compare the determined amount of three-dimensional motion of the object proximate to the first input device to a motion threshold; and
    alter the first input device to be or remain active while altering some but not all input devices of the device to an idle power state of the predetermined power states when the determined amount of three-dimensional motion is less than the motion threshold.

9. The controller of claim 8, further comprising instructions executable by the processing resource to determine the distance of the object in a first dimension and a second dimension.

10. The controller of claim 9, further comprising instructions executable by the processing resource to compare the amount of three-dimensional motion in the first dimension and the second dimension to a corresponding motion threshold for the first dimension and the second dimension.

11. The controller of claim 8, further comprising instructions to maintain a signal to cause all input devices to remain in an active power state when the determined amount of three-dimensional motion is greater than a movement threshold.

12. The controller of claim 8, wherein the motion threshold includes a respective motion threshold for a first axis, a second axis, and a third axis, wherein the detected amount of three-dimensional motion includes an amount of motion of the object along each of the first axis, the second axis, and the third axis, and wherein the amount of motion along each of the first axis, the second axis, and the third axis is compared to the respective motion thresholds for the first axis, the second axis, and the third axis relative.

13. A method comprising,
    detecting, via a motion detector included in an electronic device, an amount of three-dimensional motion of an object proximate to a first input component of the electronic device;
    comparing amount of three-dimensional motion of the object to a motion threshold;
    responsive to detecting the object, determining the amount of three-dimensional motion of the object proximate to the first input component is less than a motion threshold; and
    altering:
        a power state of the first input component of the electronic device to be or remain in an active power state; and
        a power state of a second input component of the electronic device from an active power state to a standby power state, wherein the standby power state is to consume less power over a given period of time than the active power state.

14. The method of claim 13, wherein detecting further comprises detecting the object at a distance of at least 10 centimeters away from the first input component of the electronic device.

15. The method of claim 13, wherein the motion threshold includes a respective motion threshold for a first axis, a second axis, and a third axis, wherein the detected amount of three-dimensional motion includes an amount of motion of the object along each of the first axis, the second axis, and the third axis, and wherein the amount of motion along each of the first axis, the second axis, and the third axis is compared to the respective motion thresholds for the first axis, the second axis, and the third axis relative.

\* \* \* \* \*